March 18, 1941. A. W. GOULD 2,235,745
JUICE EXTRACTOR
Filed May 17, 1938 5 Sheets-Sheet 3
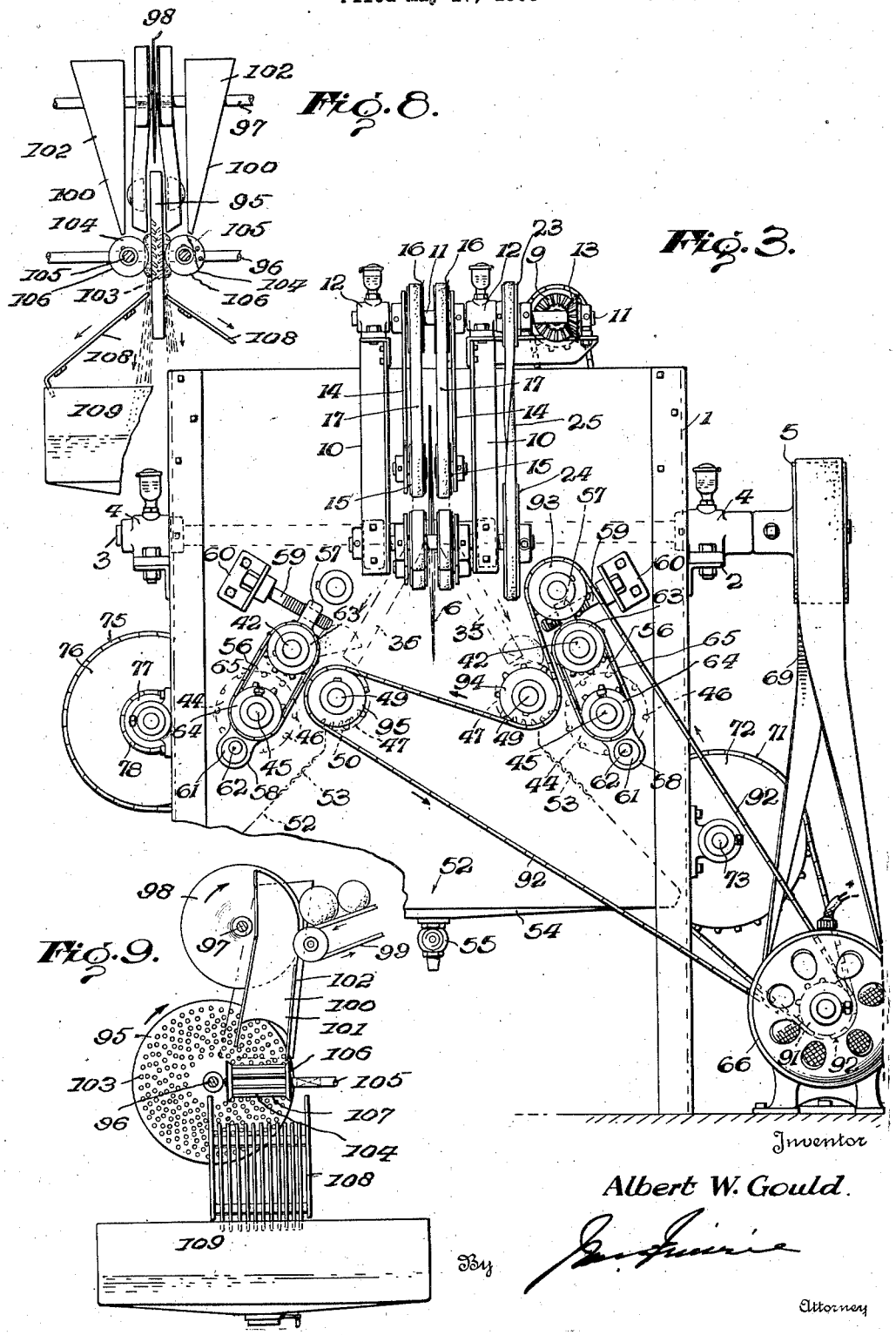
Inventor
Albert W. Gould.
By
Attorney

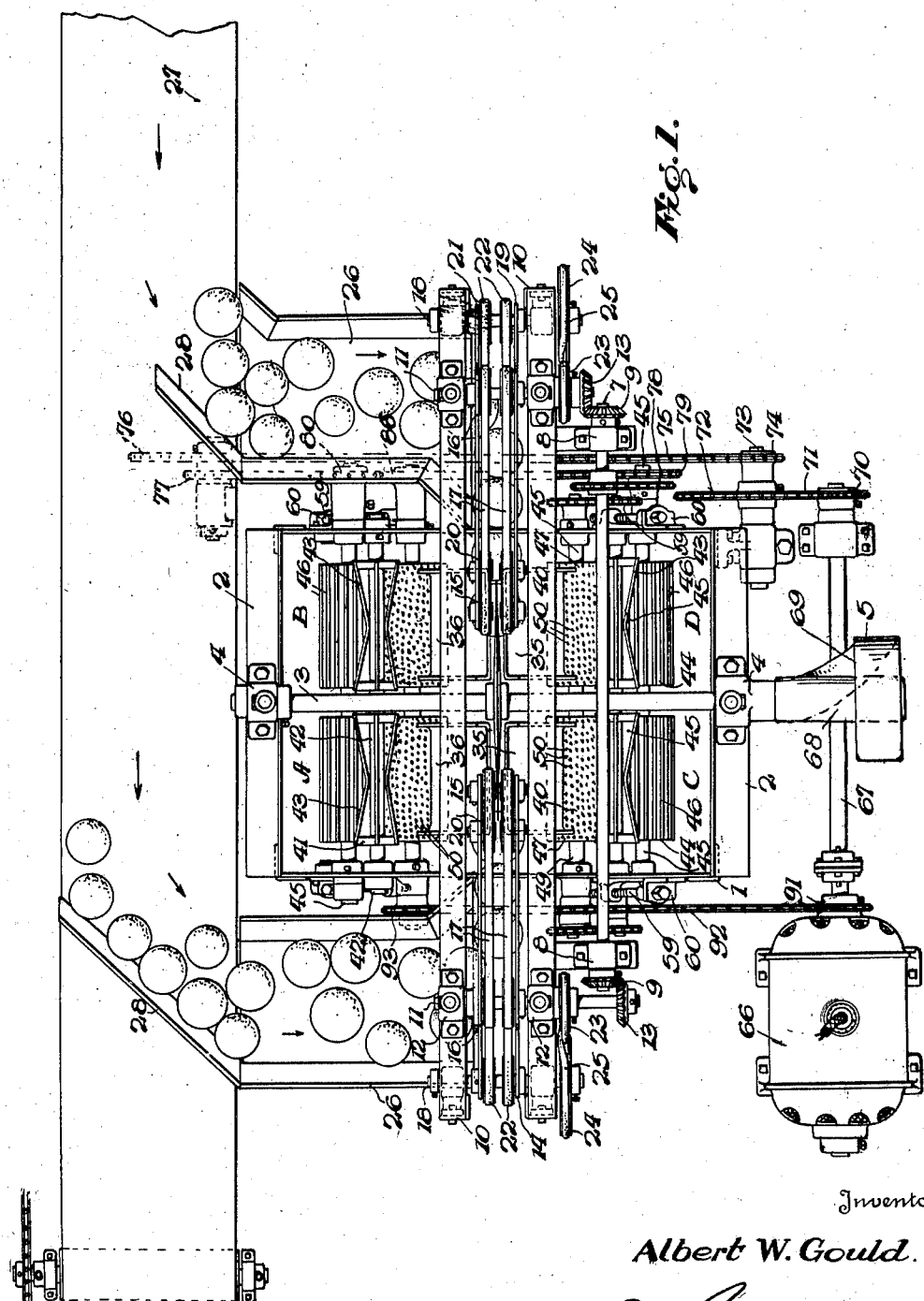

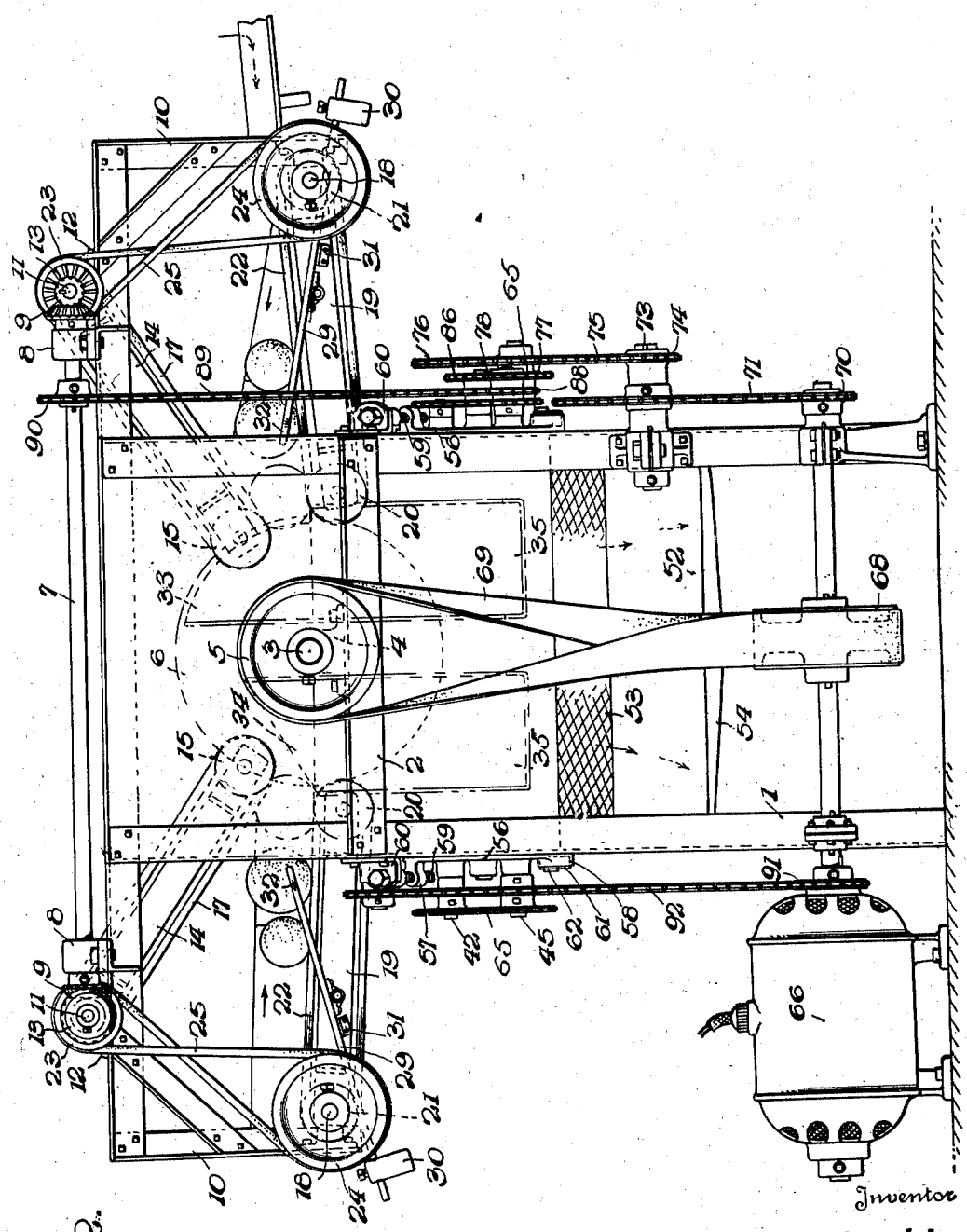

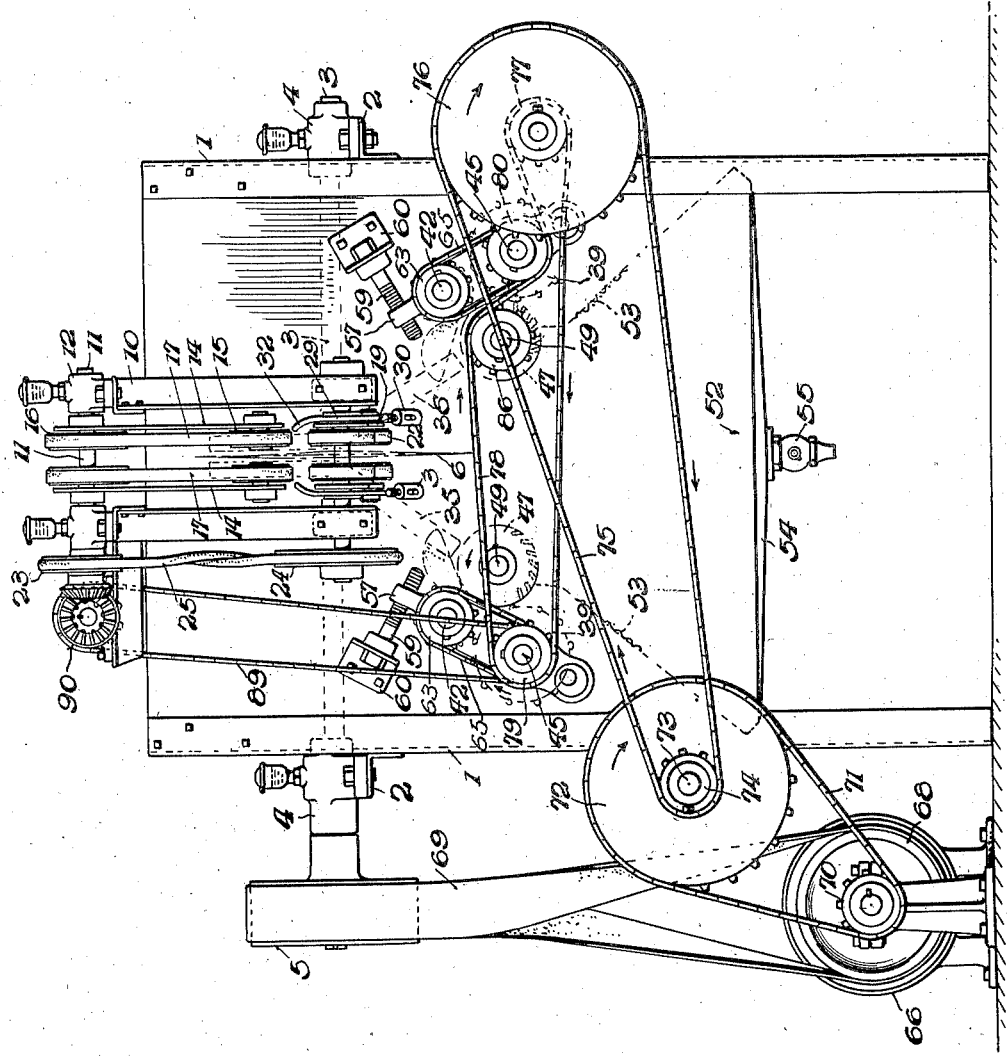

March 18, 1941.　　　A. W. GOULD　　　2,235,745
JUICE EXTRACTOR
Filed May 17, 1938　　　5 Sheets-Sheet 5
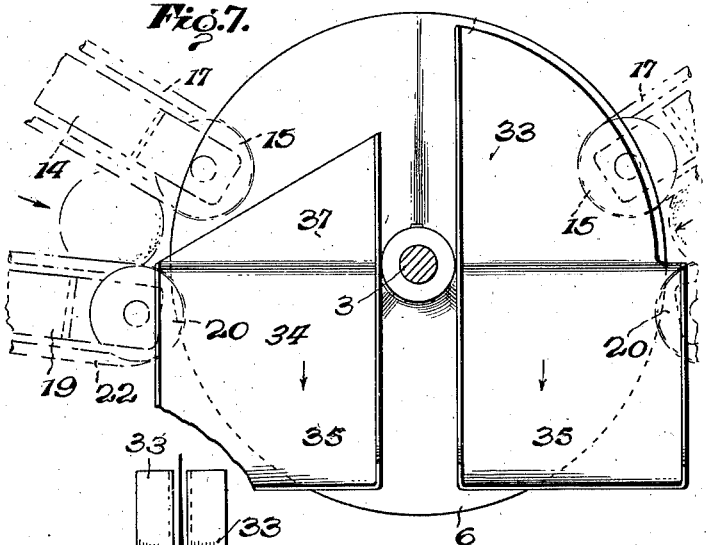
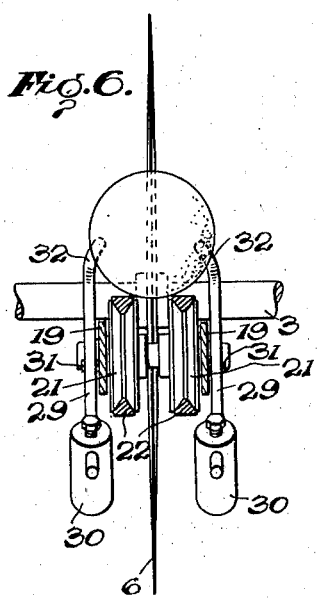
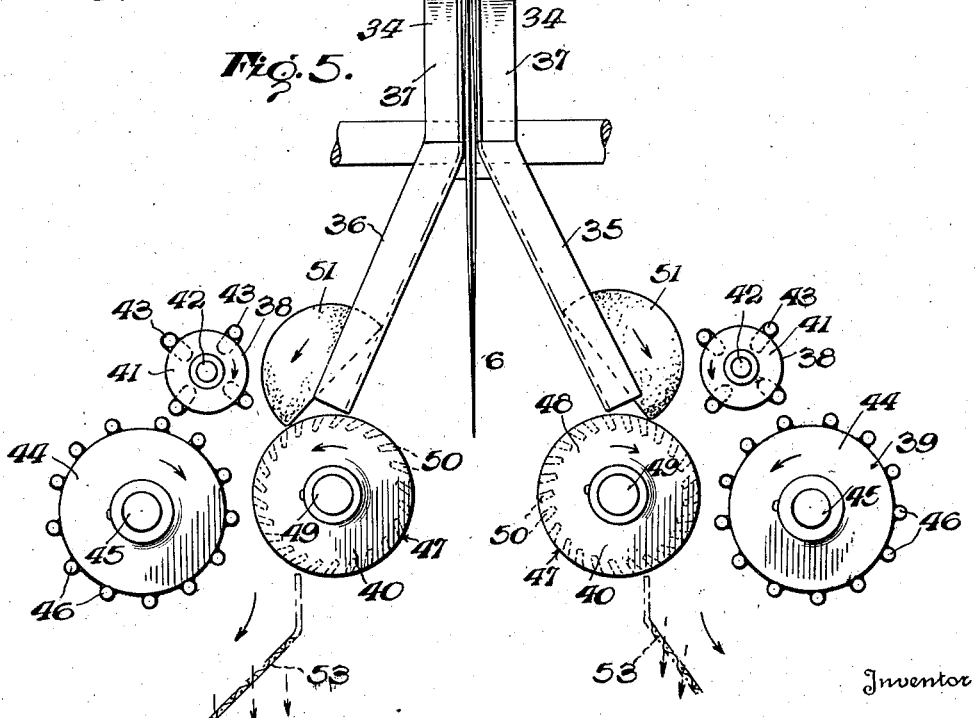
Inventor
Albert W. Gould.
By
Attorney Patented Mar. 18, 1941

2,235,745

UNITED STATES PATENT OFFICE 2,235,745

JUICE EXTRACTOR

Albert W. Gould, Loughman, Fla.

Application May 17, 1938, Serial No. 208,477

9 Claims. (Cl. 146—3)

This invention is directed to an improvement in juice extractors, more particularly for citrus fruits, wherein the fruit is fed to the machine, divided, and the sections of the fruit subjected to appropriate pressure and suction action for the substantially complete extraction of the juice.

The primary object of the present invention is the provision of a juice extractor of the type defined wherein the fruit is delivered singly in at least two distinctive paths toward an intermediately mounted revolving cutter which functions to divide the fruit into approximately equal sections or halves, with the respective halves of each fruit delivered on independent paths to its own juice extracting mechanism, whereby at least two fruit may be simultaneously divided by the cutter and the four halves thus provided simultaneously subjected to juice extraction to thereby insure maximum capacity in the handling of the fruit and the extraction of the juices therefrom.

A further object of the invention is the provision of juice extracting mechanism including a so-called vacuum extractor roll and upper and lower feed rolls for initially guiding the fruit toward and in contact with the vacuum extracting mechanism and finally feeding the fruit under pressure against the vacuum extracting roll and past such vacuum extracting roll as the extraction of the juices is completed; the upper and lower feed rolls being mounted for adjustment to effectively accommodate radically different sizes of citrus fruits of different types, such as oranges and grapefruit.

A further object of the invention is the provision of whole fruit feeding means for the single delivery of fruit along two distinctive paths toward an intermediate cutter, each whole fruit feeding means including upper and lower moving elements between which the fruit is engaged and by which it is caused to travel toward and into contact with the cutter, one of such elements moving at a speed varying from the other, whereby the fruit is caused to move on its own axis and meet the cutter while under such axial movement.

A further object of the invention is the provision of means whereby the various moving elements making up the machine are simultaneously operated in proper synchronism from a single power unit, whereby the extractor, aside from the permissible adjustments, is entirely automatic.

The invention in its preferred form is illustrated in the accompanying drawings, in which:

Figure 1 is a plan view of the improved juice extractor.

Figure 2 is a side elevation of the same.

Figure 3 is an end elevation of the same.

Figure 4 is an end elevation of the machine, the view being taken from the end opposite that shown in Figure 3.

Figure 5 is an enlarged broken elevation showing the means for guiding the severed fruit to the juice extracting mechanism, the latter being shown in operative position to receive the fruit.

Figure 6 is a broken plan view illustrating the means for centering the fruit on the fruit delivery means for causing single fruit delivery to the cutter.

Figure 7 is a detail view of the cutter and guide plates.

Figure 8 is a detailed side elevation showing a modification and illustrating sufficient detail to show the operation of the modified form.

Figure 9 is a view in front elevation of the detail of the modification as shown in Figure 8.

The improved juice extracting machine comprises a skeleton framework made of supporting uprights 1 and transverse connecting bars 2, which without further description will be understood as applied wherever necessary to support the operating instrumentalities. The framework is preferably of angle-iron, though obviously any suitable type of framework may be employed.

Shaft 3 is arranged centrally of the machine extending from the front to the rear, being supported in bearings 4 carried on appropriate cross frame bars 2 below the upper end of the machine. The shaft is extended beyond one end of the machine to receive the belt pulley 5 to serve as the driving means to be hereinafter referred to. Secured centrally on the shaft is a cutter 6, in the form of a thin blade of appropriate diameter. A shaft 7 is supported in bearings 8 at the upper end of the machine, said shaft being arranged at right angles to the shaft 3, the respective ends of the shaft being provided with beveled gears 9. The shaft 7 is designed to operate the fruit feeding mechanism, in the operation of which the fruit is delivered to the knife or cutter 6. The fruit feeding mechanism is duplicated at the opposite sides of the machine so as to deliver fruit in both directions toward the knife, each such fruit feeding mechanism being supported on auxiliary frames 10 secured to the main frame. Each fruit feeding mechanism includes a shaft 11, mounted in bearings 12, connected to the frame 10, and provided at one end with a beveled gear 13 cooperating with the adjacent beveled gear 9.

Swingingly supported on the shaft 11 are bars 14 arranged in spaced relation, and each supporting at its free end a belt roller 15. Similar belt rollers 16 are fixed on the shaft 11 in aligned relation respectively with the belt roller 15. Over each pair of aligned rollers 15 and 16 is arranged an endless belt 17, which belt is preferably of V type, as shown more particularly in Fig. 6. The spaced belts 17, which are driven in the operation of the shaft 11, constitute the upper element of the fruit feeding mechanism. Mounted in each frame 10 is a shaft 18, from which extend bars 19, which immediately underlie the bars 14 of the upper element, the free ends of which carry belt rollers 20. Mutually aligned belt rollers 21 are fixed on the shaft 18 and the correspondingly aligned rollers 20 and 21 receive endless V-shaped belts 22, which constitute the lower element of the fruit feeding mechanism. The shaft 11 is provided with a belt wheel 23, a corresponding belt wheel 24 being fixed on the shaft 18, and as the lower flight of the upper belts and the upper flight of the lower belts provide the fruit feeding members and must move in the same direction, the belt wheel 24 is driven from the belt wheel 23 by a cross belt 25. It is of course to be understood that the fruit feeding mechanism is duplicated on each side of the machine, so that fruit is being fed toward the cutter 6 from two opposite directions. The lengths of the arms 14 and 19 are such that the inner belt wheels 15 of the upper element and the inner belt wheels 20 of the lower element are arranged on each side of and inwardly with respect to the periphery of the blade 6, in order that the fruit will be under driving compulsion during the action of the knife. The upper belt element of the fruit feeding mechanism is arranged at an angle of approximately 33° to the lower belt element, and as will be evident from the relative sizes of the belt pulleys 24 and 23, the upper belt element is moving at a greater speed, of preferably approximately twice the speed of the lower belt element. Thus the fruit which is gripped between the belt elements prior to and during the delivery of the fruit to the knife is given a rolling movement about its own axis by reason of the relative belt speeds and is presented to the knife while the fruit is so moving.

The fruit is delivered to the lower belt element of each fruit feeding mechanism by means of laterally disposed troughs 26, having their delivery ends on the plane of the upper flight of the lower belt element at the outer end of such element, the fruit being thus promiscuously fed onto the spaced belts of the lower belt element, and then moved toward the cutter singly on the lower belt element until engaged by the upper belt element for positive feeding and rolling movement of the fruit. The fruit is disposed upon a belt carrier 27 and guides 28 deflect the fruit from the belt carrier to the respective chutes, the guide of the trough first receiving the fruit being about approximately one-half the width of the belt while the guide of the other trough is the full width of the belt. In this way, a certain proportion of the fruit is deflected into the first trough and the remaining portion carried into the second trough.

The fruit is of course supported by the upper flights of the spaced belt of the lower belt element, and if not naturally centered when rolling into position, means are provided by which a centering of the fruit may be obtained. This centering device is illustrated more particularly in Fig. 6, and comprises levers 29, pivotally supported on the bars 19 of the lower belt element, with their outer ends provided with an adjustable weight 30 and the movement of the levers under the influence of the weight limited by stops 31 on the bars 19. The inner ends of the levers are inwardly turned at 32, and when the levers are against the stops 31, these inturned ends are on a plane above the upper flight of the belts of the lower belt element and in the path of the fruit moving on those belts. The inturned ends of the levers are of course depressed by the oncoming fruit, but by reason of their guiding influence, will obviously center the fruit on the belts. In this way the fruit is centered when presented to the cutter so as to be divided substantially in equal parts.

As the fruit is delivered to the cutter from opposite directions, the cutter is severing one fruit by a downward stroke and the other fruit by an upward stroke. The fruit so divided is delivered to the extracting mechanism arranged below the knife, and as the respective halves of each fruit when divided are on opposite sides of the cutter, there will thus be two half sections of fruit on each side of the cutter to be delivered to independent fruit extracting means. The delivery mechanism includes guide plates 33 and 34, one on each side of the cutter and in close proximity thereto, so that the fruit when divided will be received on these guide plates and moved downwardly by gravity. Guide plate 34, which operates on that side of the knife moving downwardly to divide the fruit, has its upper edge materially below the upper operating plane of the knife, with such upper edge the periphery of the knife, with such upper edge inclined downwardly toward the lower belt element of the fruit feeding mechanism on that side. The guide 33, however, cooperating with that side of the knife by which the fruit is cut by an upward movement of the knife, is extended above the guide 34, with its upper edge following but inwardly of the peripheral edge of the knife. Thus the tendency of the fruit to move upwardly under the influence of the upwardly moving cutter edge is counteracted by the contact of the divided fruit with the upwardly extending portion of the guide 33, thus permitting the fruit to move downwardly by gravity. Substantially on a line with the axis of the cutter, the guide plates 33 and 34 are deflected outwardly from the cutter, forming inclined chutes 35 and 36, down which the fruit moves to the extracting mechanism. The guide plates are preferably provided with outstanding edges 37 to prevent possible displacement of the fruit.

As obvious from the above description that, assuming the machine in normal operation, there are four independent halves of fruit being delivered down the chutes 35 and 36, one on each of the four chutes. As the juice is to be extracted from these fruit halves, it is apparent that each half of the fruit must be handled by an independent juice extractor, so that in eect there are four juice extracting mechanisms. These four juice extracting mechanisms, indicated on Fig. 1 at A, B, C and D, are identical in construction and operation, so that a detailed description of one will suffice for all. The mechanisms involve rotating elements, and as there are two such mechanisms on each side of a chute, it is of course apparent that the shafts on which the rotating elements are mounted may be common to each pair of mechanism.

Each juice extracting mechanism includes an upper feed roll 38, a lower feed roll 39, and a so-called vacuum extracting roll 40. The upper feed roll 38 has end discs 41 mounted in spaced relation upon a shaft 42 and connected by bars 43 preferably cylindrical in cross section and inclined inwardly from each end disc 41 towards the axis of the roll to form a roll having in effect a concave peripheral surface made up of spaced parallel bars. The lower feed roll 39 of each extracting mechanism is made up of end discs 44, secured upon a shaft 45 with spaced parallel bars 46, secured to the periphery of the discs. These bars extend in straight parallel relation from one disc to the other, thereby defining a roll of skeleton form and of uniform diameter throughout. The juice extracting roll 40 comprises a solid cylindrical body 47 secured upon a shaft 49. The surface of the body is formed with more or less minute openings 50, which open through the periphery of the body. The openings are inclined to the radial, with their inner ends offset from their outer ends in the direction of rotation of the roll. Under rapid rotation of the roll 40, there is a decided suction effect created at the outer ends or mouths of the openings 50.

The respective rolls of one juice extracting mechanism have a definite relation to the chute through which the half fruit is delivered to the extracting mechanism. Thus, for example, as illustrated more particularly in Figure 5, wherein the fruit half being delivered is indicated at 51, the upper feed roll 38 is located substantially on a line with the bottom of the chute but spaced outwardly therefrom; the juice extracting roll 40 is arranged below the lower end of the chute with its upper peripheral plane of movement immediately adjacent the end of the chute and the shaft on which the roll is mounted substantially in vertical alignment with the end of the chute; while the lower feed roll 39 is arranged substantially in horizontal alignment with the vacuum roll, with the peripheries of the rolls in spaced relation, this lower feed roll 39 being arranged below the upper feed roll, with their peripheral planes of operation next the chute being substantially in vertical alignment. The fruit half is contacted by the upper feed roll before such fruit half completely leaves the chute, thereby causing the fruit half to be centered by the concave formation of the upper feed roll and directed toward and into contact with the vacuum roll 40. The fruit passing over the vacuum roll will, of course, close the openings 50 with which its inner pulp surface contacts, so that the suction tends to extraction of the juice in the fruit. The fruit half in its continued contact with the vacuum roll is engaged by the bars 46 of the lower feed roll, which compels an operative feeding movement of the fruit half under pressure exerted toward the juice extracting roll 40. This lower feed roll compels an intimate engagement of the pulp surface of the fruit half with the openings 50 forcing the pulp substance toward the vacuum roll and compelling by means of the pressure and suction a substantially complete extraction of the juice, without however, incident to the size of the openings 50, permitting the passage of any pulp or other extraneous matter.

Below each pair of juice extracting mechanisms, there is arranged a deflector 52 of foraminous material, as indicated at 53. The upper end of the deflector underlies the vacuum roll 40 and depends vertically for a short distance and then is outwardly deflected or inclined to traverse the space existing vertically between the vacuum roll 40 and lower feed roll 39. As the fruit half passes between the vacuum roll and the lower feed roll, the juice extracted will flow downwardly onto the deflector and be delivered to a juice receptacle 54 in the lower portion of the machine, having a valve controlled outlet 55. The pulp and skin, however, passing between the vacuum roll and the lower feed roll will fall onto the deflector and following its outwardly inclined portion be delivered beyond the machine for any convenient disposal. It is to be particularly understood that the extracted juice is so clear and clean of usual pulp and like extraneous matter that screening or clearing of the extracted juice is wholly unnecessary.

It is, of course, apparent that for the most effective results, means must be provided whereby the particular relations of the respective rolls of the juice extracting mechanism may be adjusted to accommodate fruit of different types. It will, of course, be presumed that to accommodate grapefruit as compared to oranges, for example, the relations of the rolls must be changed. To accomplish this result, the shaft 45 common to each pair of lower feed rolls on one side of the chute and the shaft 42 common to each pair of upper feed rolls on the same side of the chute are mounted, with respect to each pair of extracting mechanisms, in end frames or blocks 56, at each end of the machine. Thus, the shafts of the upper feed rolls of each pair of extracting mechanisms, as A and B on the one hand, and C and D on the other hand, will be connected through the blocks 56 with the shafts of the lower feed rolls of the same pair. The blocks 56, which are disposed beyond the framing of the machine, are formed at the upper ends with a threaded eye 57 and at the lower ends with a bearing 58. The threaded eyes 57 cooperate with threaded studs 59 rotatably mounted in brackets 60, secured to the frame of the machine, the studs 59 being capable of rotative movement but held from longitudinal movement with respect to the brackets. The bearing 58 at the lower end of the block receives a short stub shaft 61, from which a bearing shaft 62 extends in eccentric relation to the shaft 61, with the shaft 62 mounted in the bearing secured to the framework. Obviously, adjustment of the studs 59 will swing the unit including the end blocks 56 and upper and lower feed rolls of the pair of extracting mechanisms toward or from the adjacent suction rolls and proper rotation of the shaft 61 will, by its eccentric control of the lower end of the block 56, provide a finer adjustment more particularly with respect to the lower feed roll.

It is to be understood that a block 56 is provided at each end of each pair of juice extracting mechanisms. The shafts 42 and 45 of the upper and lower feed rolls of each pair of juice extracting mechanisms have a driving cooperation through sprockets 63 on the ends of shafts 42 and similar sprockets 64 on the ends of shafts 45, a chain 65 connecting these respective elements for driving cooperation.

It is, of course, highly desirable that all moving parts be synchronized and driven automatically to insure proper functioning and capacity of the machine. To provide for this result all mechanisms are operated from a single motor 66. The motor shaft 67 extends across the front of the machine and is provided with a belt wheel 68 connected through the medium of a twist belt 69 with the belt wheel 5 on the cutter shaft. As the belt wheels 68 and 5 are approximately of the same diameter, the cutter or knife will be driven approximately at the speed of the motor. The motor shaft carries a sprocket 70 connected by a chain 71 to an enlarged sprocket 72, supported on the framing at one side of the machine, on the shaft 73 of which is secured a small sprocket 74 for proper speed reduction. The sprocket 74 is connected through a chain 75 with a larger sprocket 76 mounted at the opposite end of the machine.

On the shaft of the sprocket 76 is mounted a smaller sprocket 77, driving an endless chain 78, which passes around a sprocket 79 secured on the terminal of shaft 45 of the lower feed roll of a pair of extractor mechanisms, as C and D, then to and over an idle sprocket 86 mounted on the extended end of shaft 49 projecting from a bearing on the frame bar, then to and beneath a sprocket 80 on the shaft 45 on the lower feed rolls of the other pair, and then back to the sprocket 77. A sprocket 88 is fixed with relation to the sprocket 79 and drives a chain 89 which leads to and drives a sprocket 90, fixed to the shaft 7 for operating the fruit feeding mechanism. Of course, it will be appreciated that the belts of these fruit feeding mechanisms are driven in the same direction, that is, so far as the lower flight of the upper belt element and the upper flight of the lower belt element are concerned, and to secure this result, gears 9 on the shaft 7 will engage the gears 13 at respectively opposite sides of the shafts of these gears.

From this arrangement it will be apparent that the drive of the various parts connected as described will from the arrow indication on Figure 4 be driven in the proper direction.

On that end of the machine adjacent which the motor is located, the motor shaft is provided with a sprocket 91 which drives a chain 92, passing up and over an idler 93, mounted on a stub shaft supported in the machine, then down and around beneath a sprocket 94 carried on one terminal of the shaft 49 of the extractor rolls of one pair, then to and over a sprocket 95 on the terminal of the shaft 49 of the extractor rolls of the other pair, and then to the sprocket 91. From the arrow indications of Figure 3, the direction of travel of the chain 92 will indicate that by the described drive, the extractor rolls are simultaneously operated and in the proper direction of rotation with respect to the feed rolls.

From the above description, it will be apparent that the fruit is delivered in two opposite paths toward the cutter, severed thereby into approximate halves and delivered through the chutes to the respective sets of juice extracting mechanisms. Of course, the cutter will sever the fruit moving along one path by a downward movement of the cutter and the fruit moving along the other path by an upward movement of the cutter. In both paths the fruit is delivered to the cutter while the fruit is under a rolling or rotative movement, and the upper belt mechanism of the fruit feeding device delivering the fruit to the upward moving edge of the cutter will prevent the fruit from rising as a result of upward cutter movement, and the halves provided by this upward movement will be directed by the extension of the guide for delivery into the chute portion of that guide. Each half is presented to its own juice extracting mechanism, centered by the upper guide roll 38, and delivered by that roll in contact with the vacuum extracting roll 40, and held by the lower guide against the extracting roll under compression until the half has passed beyond the influence of the vacuum extracting roll. The juices are extracted by the suction incident to the movement of the extractor roll through the minute openings which in the presence of the fruit are closed by the pulp surface of the fruit. The lower guide roll compels a flattening of the fruit against the extracting roll, serving for a more complete breaking down of the juice cells for release of the juice which is thereby easily drawn from the fruit by the suction effect and delivered from the openings of the extracting roll by centrifugal force through the deflector 52 into the receptacle 54.

An important advantage of the present construction is that the machine will effectively treat, within the limitations of either oranges or grapefruit, any size of fruit. This eliminates the labor and expense of grading the fruit to be treated, as usually required by other machines of this character. The adjustments provided for the feeder rolls as previously described will provide for the treatment of different types of fruit, as for example oranges and grapefruit, and such adjustment has the additional and important advantage of permitting the operator to vary the pressure relative to the extracting roll and thus vary the amount of juice extracted in a given operation, to meet particular conditions or requirements. The adjustment described for the feeder rolls is contemplated to take care of fruits of different type, as for example, oranges and grapefruit, and to afford accurate relation of the parts where the body pulp of fruit of the same grade is of different capacity, as for example in thick or thin skin oranges.

In Figures 8 and 9 there is illustrated a slightly modified form of construction, wherein the vacuum roll for the extraction of the juice is arranged in disk form rather than as a cylindrical roll, as in the form first described.

In this form, the extractor means is in the form of the comparatively flat solid disk 95, secured on a shaft 96 mounted in the framework in parallelism with the shaft 97, carrying the knife or cutter 98. Means indicated at 99, of any conventional form and of the form previously described if desired, is arranged for feeding fruit to the knife for division into halves, as in the first form. Guides 100 are arranged to receive the half fruit and guide such onto opposite faces of the extracting disk 95. The floor or upright wall 101 of the guides terminates approximately in the plane of movement of the disk through its upper path of travel, and the side walls 102 of the guides, serving to prevent lateral movement of the fruit, extend below the upper plane of movement of the disk. Thus, the fruit is guided onto the respective surfaces of the disk, and as the floor of the guides is a plane slightly offset axially of the disk, the open or cut side of each fruit half is delivered practically in contact with the disk.

The opposite faces of the disk are formed with comparatively minute openings or cells 103, arranged in more or less close order, and which are inclined longitudinally, with their lower ends offset from their upper ends in the direction in which the disk is traveling. The rapid rotation of the disk creates a suction effect in these cells, and as the surface of the fruit is held in contact with the mouths of these cells, the juice is withdrawn from the fruit by this suction effect. The suction effect is the same as in the cylindrical rolls previously described.

Pressure rolls 104 are mounted on appropriate shafts 105 arranged at right angles to the disk shaft 96 and about in line therewith. The pressure rolls are preferably of skeleton type with end sections 106 with interconnecting, spaced, parallel bars or rods 107. The pressure rolls are of a length corresponding to the full width of the possible path of the fruit presented by the guide, so that all fruit passes between the disk 95 and the pressure roll, with the effect to compress the fruit relative to the disk surface, and render the juice extraction more effective. A pressure roll 104 cooperates with opposite surfaces of the disk 95, so that the two halves of the divided fruit are simultaneously handled. Below each pressure roll is a slatted guide 108 to receive and deflect the fruit from which the juice has been extracted and which has passed the pressure roll. The juice thrown off from the cells 103 of the disk 95 by centrifugal force falls into a receptacle 109 from which it may be withdrawn at will.

In this form only single fruit may be handled, that is fruit delivered into the machine from one side only, instead of from two sides as in the previously described form. This for the reason that the disk face in the plane of movement on the two halves of one fruit is moving downwardly, while the opposite half of the disk, vertically considered, is moving upwardly. As the upwardly moving face portion could not be used for fruit extraction of downwardly moving fruit, no use is made of this upwardly moving section in the present modification.

The parts described may be adapted for any conventional mechanical adjustment, and are of course appropriately driven through any conventional means. Neither such possible adjustment nor driving means forms part of this detail of the invention and is not illustrated.

The various parts are preferably constructed of metal which will avoid contamination of the juices and to be of itself free of corrosion or other deterioration in use. However, it is understood that any and all materials which may appropriately serve the function are contemplated for use.

It will be remembered, as frequently stated, that the extracting rolls 40 each comprises a solid cylindrical body 47 formed with a plurality of minute openings 50 which open at their outer ends through the periphery of the body and are closed at their inner ends. As the rolls 50 are rapidly rotated the body of air moving relatively and over the open ends of the openings 50 will obviously extract a very considerable portion of the air otherwise held in these openings. Therefore, there is, both theoretically and practically, a partial vacuum created within the respective openings 50, and this vacuum is of automatic and continuous generation during the rotation of the rolls. As the half fruit is pressed against the open ends of these openings 50, incident to the passage of such half fruit past the fed roll 38 and the pressure or lower feed roll 39, the open ends or mouths of the openings 50 from which the air has been largely withdrawn, as stated, are brought into direct contact with the pulp of the fruit. The pressure in the openings being subatmospheric, the openings so engaging the fruit suck in pulp from the fruit, which pulp is thrown out of said openings by centrifugal force and gravity when the openings have moved beyond the fruit.

What I claim is:

1. A juice extracting machine for citrus fruits and the like, comprising fruit dividing means, fruit feeding means for delivering the fruit to the dividing means, and juice extracting means receiving and operating on the divided fruit and including vacuum producing means comprising rotating elements having a wall formed with recesses of appreciable depth closed at their bottom and having open mouths in the plane of the surface of the rotating element, the air in said recesses being rarefied by the rapid rotating movement of the element, and means for pressing the fruit divisions into direct contact with said wall.

2. A construction as defined in claim 1, wherein the vacuum extractor includes a rotating circular element formed with recesses in the periphery of the element, and having their open ends in the plane of the periphery of the element and their opposite ends closed, the recesses being inclined with respect to the radial line of the element.

3. A construction as defined in claim 1, wherein the vacuum extractor includes a rotating cylindrical element formed with recesses having their open ends in the plane of the surface of the element and their opposite ends closed, the recesses being inwardly inclined from the radial line of the element and toward the direction of rotation of the element.

4. A juice extractor for citrus fruit and the like, comprising a single revolving cutter, whole fruit feeding means for delivering fruit to the operative edge of the cutter moving in one direction, whole fruit feeding means for simultaneously delivering whole fruit to the operative edge of the cutter moving in the opposite direction, juice extractor mechanisms for the severed fruit, and guides for delivering the severed fruit from the operative plane of the cutter to the juice extractor mechanisms, one of said guides at least extending materially above the operative plane of the cutter at which the fruit is severed.

5. A construction as defined in claim 4, wherein the guides are stationary and arranged in such proximity to the cutter as to receive the fruit halves as they are formed by the cutter.

6. A construction as defined in claim 4, wherein one of the guides terminates in an inclined edge materially below the upper operative plane of the cutter and the other of the guides terminates in an edge concentric with and spaced from the operative edge of the cutter and extending materially above the inclined edge of the other guide.

7. A juice extracting machine for citrus fruits, including a rotary cutter, a whole fruit feeding means for delivering fruit to the cutter, and juice extracting mechanism receiving and operating on the divided fruit, the whole fruit feeding means involving upper and lower sets of endless belts terminating at their delivery end inwardly of the operative plane of the cutter, the upper set of belts being driven at an increased speed with respect to the travel of the lower set of belts to thereby compel a rolling action of the fruit throughout the full period of cutter operation thereon.

8. A construction as defined in claim 7, wherein each set of belts comprise endless spaced parallel elements to permit the operative plane of the cutter to pass between them and to support the respective sections of the fruit on opposite sides of the cutter during the cutting operation.

9. A juice extractor for citrus fruits, including a revolving knife, a whole fruit feeding means for delivering fruit in contact with the knife, means for delivering the divided fruit from the whole fruit feeding means along predetermined paths, and a juice extracting mechanism arranged at the terminal of each of said paths, said juice extracting mechanism including an upper concave feed roll for centering the fruit and moving it downwardly, a roll formed with recesses closed at one end and open at the other, means for operating the roll to cause the air in the recesses to be subjected to rarefication in the movement of the roll in contact with the atmosphere, the surface of the roll through which the recesses open presenting an area onto which the fruit is guided by the upper guide roll, a lower guide roll for exerting pressure on the fruit while in contact with the vacuum extracting roll, and means for simultaneously and similarly adjusting the upper and lower guide rolls to accommodate fruits of different sizes.

ALBERT W. GOULD.